T. G. LEMPGES.
SIGNAL DEVICE.
APPLICATION FILED OCT. 11, 1919.
1,349,774.
Patented Aug. 17, 1920.
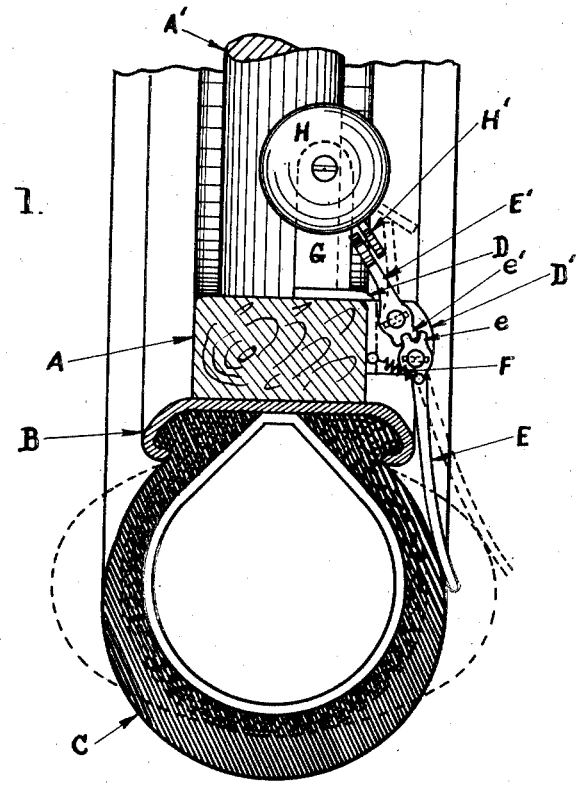
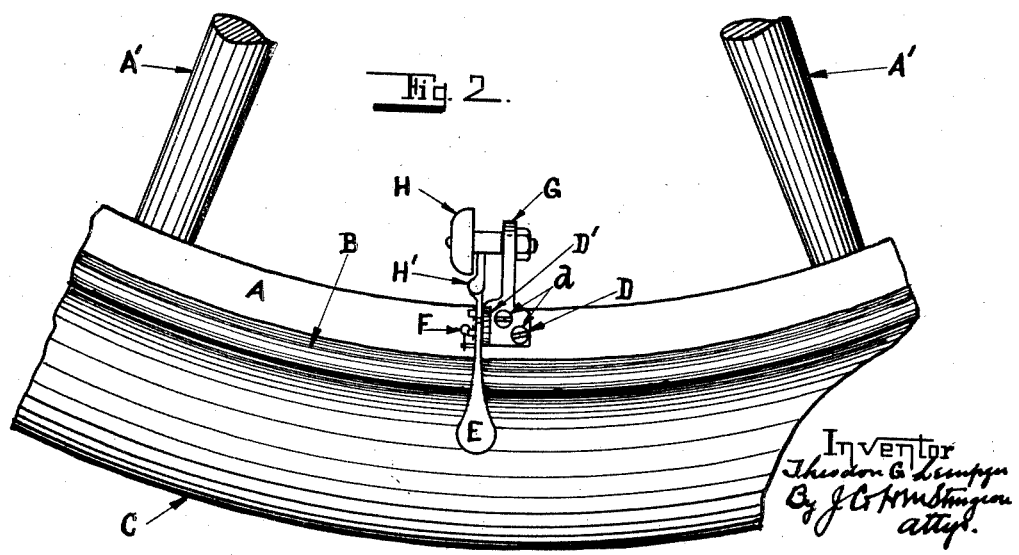

UNITED STATES PATENT OFFICE.

THEODORE G. LEMPGES, OF DUNKIRK, NEW YORK.

SIGNAL DEVICE.

1,349,774.

Specification of Letters Patent.

Patented Aug. 17, 1920.

Application filed October 11, 1919. Serial No. 330,015.

*To all whom it may concern:*

Be it known that I, THEODORE G. LEMPGES, a citizen of the United States, residing at Dunkirk, in the county of Chautauqua and State of New York, have invented certain new and useful Improvements in Signal Devices; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to signal devices and the object thereof is to provide mechanism by means of which the driver of a motor vehicle may have warning of the deflation of the tires on the vehicle.

The features of my invention are hereinafter described and pointed out, and are illustrated in the accompanying drawings, in which:

Figure 1, is a vertical section of a fragment of motor vehicle wheel and pneumatic tire, with my invention installed thereon.

Fig. 2, is a side elevation of the same on a reduced scale.

In these drawings A indicates the wheel felly, and A' indicates wheel spokes; B indicates the wheel rim, and C indicates a pneumatic tire thereon; all of usual and ordinary construction.

On the felly A of the wheel I secure an angle iron D which fits around the corner thereof as shown in Fig. 1, and is secured thereto by means of screws $d$, as shown in Fig. 2, which hold the vertical arm of the angle iron D against the vertical face of the wheel felly. The vertical arm of the angle iron D is provided with an out-turned ear D', upon which is pivoted a lever E, which is pressed against the side of the tire C by means of a spring F. This lever E is provided with teeth $e$ which engage like teeth $e'$ on a lever E' which is also pivoted on the ear D'. The arm of the angle iron D which extends over the inner periphery of the felly A is provided with an up-turned arm G upon which I secure a signal bell-mechanism H of ordinary construction.

The operating lever H' of the bell-mechanism H will be engaged by the lever E', so that when the tire C becomes deflated, and the weight of the vehicle causes the tire to flatten, as shown by broken lines in Fig. 1, the lever E will be moved outwardly thereby, as shown in broken lines in Fig. 1, which will cause the lever E' to operate the bell lever H' to ring the bell H.

This device being mounted upon the wheel felly, between the spokes of the wheel, as shown in the drawings, does not project beyond the circumferential plane of the wheel, and is therefore not liable to injury.

Having thus fully shown and described my invention so as to enable others to utilize the same, I do not desire to limit myself to the exact construction of mechanism herein shown and described, as it is obvious that many modifications can be made therein without departing from the scope of my invention.

Therefore what I claim as new and desire to secure by Letters Patent is:—

In a device of the class described, a vehicle wheel having a pneumatic tire thereon, an angle-iron secured on the felly of said wheel, a bracket-arm on said angle-iron radially positioned between spokes of said wheel, a signal device including an operating lever, supported on said bracket-arm, an out turned ear on said angle iron, a pair of levers pivoted on said ear, one of which levers engages the operating lever of said signal device, and the other of said levers engages the side of said tire, and intermeshing teeth on said levers, whereby the movement of the tire actuated lever is imparted to the other lever, substantially as set forth.

In testimony whereof I affix my signature.

THEODORE G. LEMPGES.